(No Model.)

L. P. LAWRENCE.
PACKING FOR PISTONS.

No. 408,981. Patented Aug. 13, 1889.

WITNESSES:
Henry Huber
Carl Katz

INVENTOR
Louis P. Lawrence
BY
Goepel & Raegener
ATTORNEYS

UNITED STATES PATENT OFFICE.

LOUIS P. LAWRENCE, OF PASSAIC, NEW JERSEY, ASSIGNOR TO THE LAWRENCE RAILWAY BRAKE COMPANY, OF NEW YORK, N. Y.

PACKING FOR PISTONS.

SPECIFICATION forming part of Letters Patent No. 408,981, dated August 13, 1889.

Application filed March 6, 1889. Serial No. 302,169. (No model.)

*To all whom it may concern:*

Be it known that I, LOUIS P. LAWRENCE, of Passaic, in the county of Passaic, State of New Jersey, a citizen of the United States, have invented certain new and useful Improvements in Packing for Pistons, of which the following is a specification.

This invention relates to improvements in the packing-rings for the pistons of power-brakes; and the object of my invention is to provide a packing which is easily applied, is held firmly and securely, and cannot be readily removed or interchanged, and which forms a tight and close joint for the cylinder without causing undue friction.

The invention consists in the construction and combination of parts and details, as will be fully described and set forth hereinafter, and finally pointed out in the claims.

Figure 1:
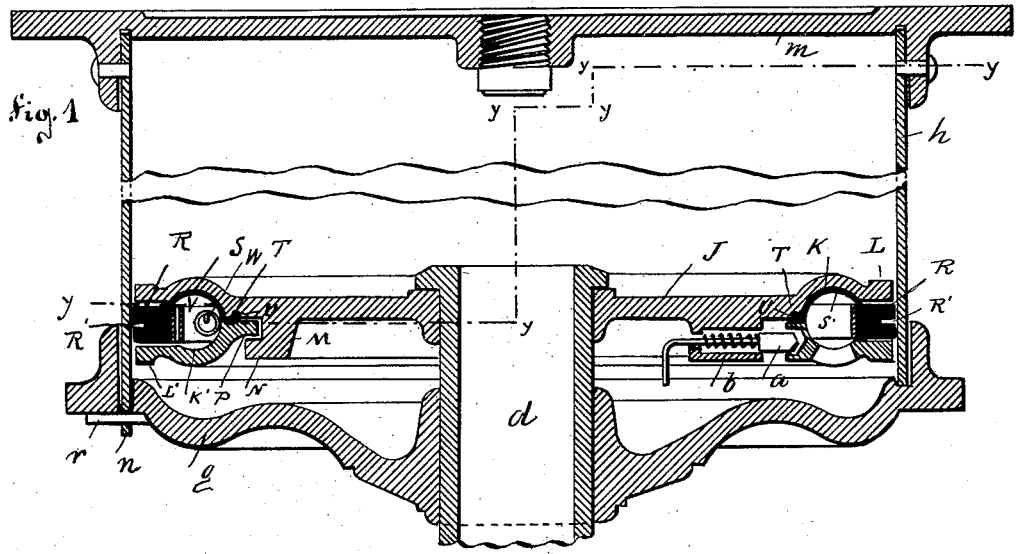
Figure 2:
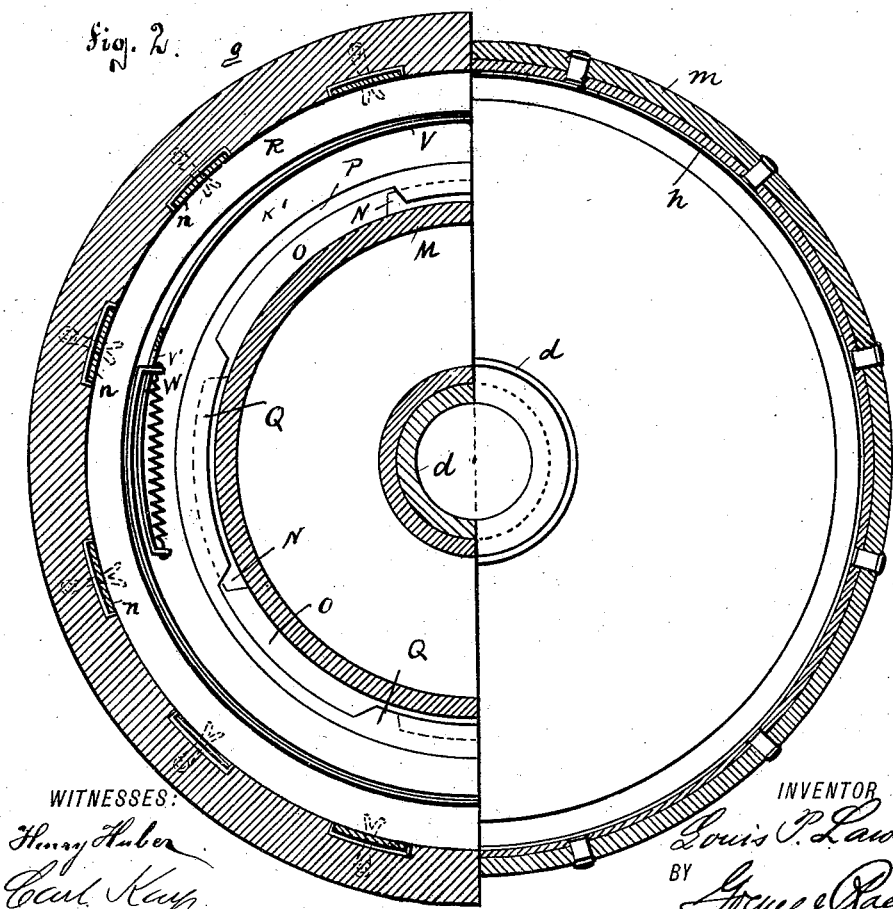

In the accompanying drawings, Figure 1 is a vertical transverse sectional view of a brake-cylinder and piston therein provided with my improvements. Fig. 2 is a horizontal sectional view on the line $y\ y\ y\ y\ y\ y$, Fig. 1.

Similar letters of reference indicate corresponding parts.

The piston J is provided on its inner or lower face with an annular groove K a short distance from the edge, so as to form the lip L along the edge of the piston. The piston is also provided on its under side with a downwardly-projecting annular rib M, having an outwardly-projecting flange N, provided with a series of notches O in its edge. A ring P is provided in its upper surface with an annular groove K', forming a lip L' along the outer edge of said ring. From the inner edge of the ring P lugs Q project, which can be passed through the notches O of the flange N. The rubber packing-ring R, which is rectangular in cross-section, is provided in its outer edge with an annular groove R' to increase its elasticity, and on the top of its inner edge with an annular wing S, provided along its free edge with a bead T, which can be passed into an annular groove U in the under side of the piston and a short distance inward from the inner edge of the groove K.

The packing-ring R is placed against the lip L of the piston J, the bead T being placed in the groove U. An expansion-ring V is placed against the inner edge of the packing-ring R, the ends of said ring overlapping and being bent inward to form abutments for a spring W, interposed between them and serving to keep the ring V spread, so that the same exerts an outward pressure on the packing-ring R. One bent end of the ring V passes through a slot V' in the other end, as shown in Fig. 2. The ring P is then placed against the under side of the piston in such a manner that the lugs Q pass through the notches O of the flange N, and is then turned to bring the lugs Q between the under side of the piston and the lugs formed between the notches O. The ring P is locked in this position by a spring-bolt $a$ in a box or casing $b$ on the under side of the piston. The upper edge of the ring P, pressing against the inner edge part of the rubber wing S, forms a close and tight joint.

The piston-rod $d$ is secured to the piston J in any well-known manner.

The cylinder $h$ is riveted to the top head $m$, and is provided on its bottom edge with tongues $n$, which are passed through slots in the bottom head $g$. Spring-keys $r$ are then passed through said tongues for the purpose of holding the bottom head on the cylinder.

Having thus described my invention, I claim as new and desire to secure by Letters Patent—

1. The combination, with a piston having a notched flange on one face, of a notched ring engaging said flange, a packing-ring between the piston and the notched ring, and a spring-bolt for locking the notched ring in place, substantially as set forth.

2. The combination, with a piston provided in one face with an annular groove a short distance back of the edge and forming a lip along the said edge, of a ring held on the piston, and also provided with an annular groove forming a lip, and a packing-ring held between said lips, substantially as set forth.

3. The combination, with a piston having an annular groove in one face a short distance from the rim, of a ring held on the piston and having a like annular groove, a packing-ring held between said piston and ring, an expansion-ring resting against said packing-ring and having its ends overlapped, and a spring between said overlapped ends of the expansion-ring, substantially as set forth.

In testimony that I claim the foregoing as my invention I have signed my name in presence of two subscribing witnesses.

LOUIS P. LAWRENCE.

Witnesses:
OSCAR F. GUNZ,
FREDK. B. VAN VORST.